Patented Aug. 9, 1932

1,870,249

UNITED STATES PATENT OFFICE

IVAN GUBELMANN AND ROBERT J. GOODRICH, OF SOUTH MILWAUKEE, AND WILLIAM L. RINTELMAN, OF MILWAUKEE, WISCONSIN, ASSIGNORS, BY MESNE ASSIGNMENTS, TO E. I. DU PONT DE NEMOURS & COMPANY, A CORPORATION OF DELAWARE

ANTHRAQUINONE BODY AND PROCESS OF PREPARING SAME

No Drawing.  Application filed December 14, 1928.  Serial No. 326,147.

This invention relates to the purification and isolation of anthraquinone-2,6-disulfonic acid bodies from a mixture containing other anthraquinone sulfonic acids and more particularly to the purification and isolation of said body in the form of its ammonium salt from other products formed during the sulfonation of anthraquinone or anthraquinone-beta-sulfonic acid.

It is an object of this invention to provide a method of obtaining an anthraquinone-2,6-disulfonic body in a relatively high state of purity, as it is a valuable material for use in the manufacture of dyestuffs.

Other and further important objects of this invention will be apparent from the disclosures in the specification and the appended claims.

As is known, the sulfonation of anthraquinone to the disulfonic acid produces mainly the 2,6-isomer and the 2,7-isomer when the sulfonation is carried out under known methods to give a beta sulfonation. Although the mixture of these acids is of relatively small importance for certain products, the individual acids, namely, anthraquinone-2,6-disulfonic acid and anthraquinone-2,7-disulfonic acid when in technically pure form are of considerable importance. Former methods of separating these bodies have utilized the fact that the sodium or potassium salts of the respective acids are of relatively different solubility in water or dilute acid.

We have now found that the ammonium salts of these acids show even more favorable properties in effecting a separation of the two isomers and in separating the anthraquinone-2,6-disulfonic acid body from the naturally occurring impurities in the diluted sulfonation mass. The proposed method provides a cheap and rapid process for the separation of a 2,6-anthraquinone disulfonic acid body from isomeric beta sulfonic acids and from other impurities developed in the step of sulfonating. The advantage gained may be summarized in the statement that highly efficient separation may be had in a single crystallization of the ammonium salts to the end that a practically pure ammonium salt of anthraquinone-2,6-disulfonic acid precipitates and can be separated from the mother liquor. The present invention in its preferred form similarly has the advantage that strongly acid filtrations are avoided, thereby eliminating the higher cost of upkeep and of the original installation of acid resisting equipment.

If desired, varying degrees of purification may also be effected by varying the conditions, such as concentration of the water solution, the temperature and by adding water soluble salts, in particular, the soluble salts of ammonia. In case it is desired to recover the 2,7-isomer from the mother liquors after separating the 2,6-isomer, as for example in our preferred method, this is effected by the further addition of a salt, such as common salt.

It is further known that the ammonium salt of the 2,6-isomer possesses certain other inherent advantages over the previously known salts in making other derivatives used in dyestuff manufacture.

The following examples will serve to illustrate the embodiment of our preferred method, but the invention is not limited to these examples:

Example 1

A sulfonation mass, such as may be obtained by the sulfonation of anthraquinone or its beta sulfonic acid, or the like, and containing about ten parts of a mixture of 2,6- and 2,7-disulfo anthraquinone in approximately 35 parts of sulfuric acid is cooled somewhat and poured into 80 parts of cold water. To this diluted and cooled sulfonation mass is now added 26% ammonia water until the solution is neutral. The neutralized mass is then heated to the boiling point and just sufficient hot water added to effect practically complete solution of the ammonium salt of the 2,6-disulfonic acid. The solution is cooled to 25 to 30° C. and agitated until precipitation is complete (about 10 hours). The product is filtered off and washed with a small amount of 15% ammonium sulfate solution, dried and ground. This product is the ammonium salt of anthraquinone-2,6-disulfonic acid. The 2,7-isomer may be recovered from the mother liquor by the addition of common salt.

Example 2

10 parts of dry para'-sulfo-benzoyl-ortho-benzoic acid (disodium salt) are introduced into 15 parts of 25% oleum. The mixture is then heated to about 150° C. and held at this temperature for about three hours at the end of which time 10 parts of 60% oleum are added. After the 60% oleum has been introduced, a temperature of about 150° C. is maintained for about four hours. The sulfonation mass is then cooled somewhat and charged into 80 parts of cold water. The dilution mass is worked up as in Example 1 by the addition of ammonia.

It is to be understood that the conditions specified in the examples may be altered to some extent with respect to the concentration of acid and temperatures employed to give satisfactory results, as for example it is not necessary to completely neutralize all the sulfuric acid in the sulfonation mass with the ammonia as good separation of an ammonium salt may be effected even though the solution is not completely neutralized. It is further known that it is not necessary to add ammonia as such to the diluted sulfonation mass but that in its place a salt such as ammonium sulfate may be used. We prefer for mechanical reasons to completely neutralize the solution. This invention contemplates broadly the isolation and separation of anthraquinone-2,6-disulfonic acid from its naturally occurring impurities such as isomeric sulfonic acids and hydroxy sulfonic acids in the form of an ammonium salt.

We are aware that many changes may be made and numerous details of the process may be varied thru a wide range without departing from the principles of this invention and we, therefore, do not purpose limiting the patent granted hereon otherwise than necessitated by the prior art.

We claim as our invention:

1. The method of separating an anthraquinone-2,6-disulfonic acid body from isomeric beta anthraquinone sulfonic acids which comprises converting an aqueous solution of the said acids into their respective ammonium salts and crystallizing out the ammonium salt of the 2,6-anthraquinone-disulfonic acid.

2. The process of isolating anthraquinone-2,6-disulfonic acid, which comprises converting a mixture of 2,6 and 2,7-disulfonic acids of anthraquinone into a solution of their respective ammonium salts, cooling to effect selective precipitation of the ammonium salt of anthraquinone-2,6-disulfonic acid and recovering the latter body.

3. The process of isolating anthraquinone 2,6-disulfonic acid from a mixture containing anthraquinone 2,6- and 2,7-disulfonic acids, which comprises converting said isomeric disulfonic acids into their respective ammonium salts in water solution, effecting selective precipitation of the ammonium salt of anthraquinone 2,6-disulfonic acid and recovering said ammonium salt of anthraquinone 2,6-disulfonic acid.

4. The process of isolating anthraquinone 2,6-disulfonic acid from a mixture containing anthraquinone 2,6- and 2,7-disulfonic acids, which comprises converting said isomeric disulfonic acids into a saturated water solution of their respective ammonium salts at about the boiling point of said solution, cooling to approximately 25 to 30° C. with agitation to thereby effect precipitation of the ammonium salt of anthraquinone 2,6-disulfonic acid and recovering said ammonium salt of anthraquinone 2,6-disulfonic acid.

5. As a new product, an ammonium salt of anthraquinone 2,6-disulfonic acid.

6. The process of separating anthraquinone-2,6-disulfonic acid from a solution containing it together with its naturally occurring sulfonation impurities which comprises adding an ammonium compound to said solution to thereby convert the acid and its impurities to their respective ammonium salts, heating the resulting mixture to boiling and cooling to precipitate therefrom the ammonium salt of anthraquinone 2,6-disulfonic acid.

7. The process of separating anthraquinone 2,6-disulfonic acid from a solution containing anthraquinone 2,6- and 2,7-disulfonic acids, which comprises adding an ammonium compound to said solution in such amounts as to convert said acids into their respective ammonium salts, heating the resulting mixture to boiling and cooling to precipitate the ammonium salt of anthraquinone 2,6-disulfonic acid.

8. The process of separating anthraquinone 2,6-disulfonic acid from a solution containing anthraquinone 2,6- and 2,7-disulfonic acids, which comprises adding ammonium hydroxide to said solution in such amounts as to substantially neutralize the same and thereby convert said acids into their respective ammonium salts, heating the resulting mixture to boiling and cooling the same to a temperature of approximately 25 to 30° C. with agitation to effect the separation of the ammonium salt of anthraquinone 2,6-disulfonic acid.

In testimony whereof we have hereunto subscribed our names at Carrollville, Milwaukee County, Wisconsin.

IVAN GUBELMANN.
ROBERT J. GOODRICH.
WILLIAM L. RINTELMAN.